Oct. 16, 1951  L. W. AUSTIN  2,571,102
MAGNESIA REFRACTORY MATERIALS
Filed Sept. 25, 1947
N° 1 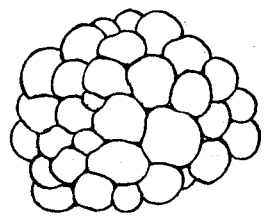
N° 2 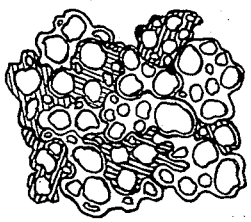
N° 3 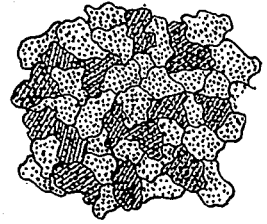
N° 4 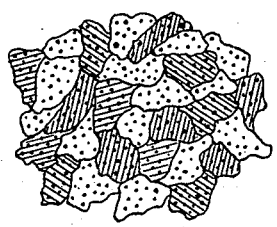
N° 5 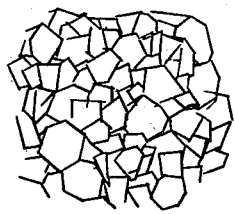
Leslie W. Austin
By- James E. Toomey
Agent Patented Oct. 16, 1951

2,571,102

UNITED STATES PATENT OFFICE 2,571,102

MAGNESIA REFRACTORY MATERIALS

Leslie W. Austin, San Jose, Calif., assignor to Kaiser Aluminum & Chemical Corporation, a corporation of Delaware Application September 25, 1947, Serial No. 776,124

2 Claims. (Cl. 106—58)

This invention relates to refractory compositions containing magnesia, and to methods of preparing the same, and it relates particularly to refractories containing predominating amounts of magnesia.

This application is a continuation-in-part of my co-pending applications Serial Number 541,120, filed June 19, 1944, and Serial Number 532,210, filed April 21, 1944, both now abandoned.

To properly understand the contribution of the present invention to the refractory art an appreciation of the short-comings of previous magnesia refractories, it is necessary to distinguish between shaped refractories—which are most often composed of an aggregate of refractory grains bonded together into the required shape—and the refractory base material of which the individual refractory grains are composed. The present invention is concerned primarily with improvement in the refractory base material.

The individual refractory grains of the magnesia refractories which are obtainable by the methods known to the art consist of rounded crystals of magnesia bonded together into the refractory grain by a more or less glassy matrix comprising the eutectics between magnesia and the impurities inherent in the raw materials. This glassy matrix constitutes one of the chief deficiencies in earlier magnesia refractory materials. While magnesium oxide itself is one of the most refractory materials commonly available, melting at about 2800° C. (5072° F), in combination with the usual glassy matrix it develops an imperfectly formed cubical crystal habit, resulting in rounded edges, which permit the grain to be deformed relatively easily under load at the softening temperature of the matrix. Thus, the serviceability of the refractory under load at elevated temperatures is determined, not by the refractoriness of the magnesia crystals, but by the properties of the matrix bonding the crystals together. Furthermore, in addition to decreasing the load-bearing ability at high-temperatures, the glassy matrix also impairs the resistance of the refractory material to thermal spalling.

Magnesia refractory raw materials commonly contain, in addition to magnesium oxide: silicon dioxide, calcium oxide, iron oxide, aluminum oxide and other impurities such as boric oxide, alkalies, etc. These elements are referred to as the oxides, in the analytical sense, whereas in the actual mineral they may be present in combination—for example, as silicates. In most combinations in a system dominated by magnesia, these impurities yield eutectics which tend to result in relatively low-melting glasses. These glasses are a source, usually the principal source, of the matrix described.

Magnesia refractory materials contain the aforementioned impurities in varying amounts, depending on the source, and the presence of appreciable amounts of the respective impurities determines the service for which the material is suitable. For example, Table I gives a representative analyses of various refractory materials

TABLE I

| Material No. | 1 | 2 | 3 |
|---|---|---|---|
| MgO | 82.5 | 92.8 | 95.2 |
| $SiO_2$ | 6.9 | 5.1 | 2.8 |
| CaO | 5.2 | 1.6 | 1.5 |
| $Al_2O_3$ | 1.4 | 0.3 | 0.3 |
| $Fe_2O_3$ | 4.0 | 0.2 | 0.2 |

Material No. 1 is a typical "dead-burned magnesite" made by burning a magnesite ore until the magnesia is substantially completely crystallized. The presence of large amounts of fluxing impurities in this material reduces the refractoriness of the composition to the extent that grains of this material are easily sintered together into a monolithic mass at ordinary steel furnace temperatures e. g. 1550–1650° C. The load bearing ability of this material at high temperatures is too poor to recommend its use in refractory brick manufacture.

Material No. 2 is of higher purity. This material is made from sea-water magnesia, and must be burned much higher than No. 1 to secure the same degree of crystallization and physical stability of the product. It does not sinter together readily except at very high temperatures, and although previously fired to high temperatures, bricks made of this material will in general fail by shear under a load of 25 pounds per square inch at 1600° C. or lower.

In an endeavor to obtain increased refractoriness, a material, No. 3 of even higher purity has been manufactured from seawater, but in this case insufficient bonding material is provided to tie the rounded MgO crystals together, and bricks of this material have been found to fail by shear under a load of 25 pounds per square inch at temperatures of 1400° C. to 1450° C., or at even lower temperatures. In this case, although the material is highly refractory, it is in general again unsatisfactory for refractory brick manufacture because of its poor load-bearing ability at high temperatures.

It has been customary in the art, therefore, to specify magnesia refractory material of approximately the composition of material No. 2 of Table I for refractory brick manufacture, because such material has appeared to give the best compromise between refractoriness and bonding strength. When magnesia from ores such as magnesite and brucite is employed higher amounts of the other impurities have been tolerated but the silica is ordinarily not allowed to exceed about 5.0%. Higher silica content in a characteristically magnesia refractory grain has been considered inadvisable or unworkable because of the reduction in refractoriness and supposed consequent decrease in resistance to load at high temperatures. Where material of higher silica content has been employed, the art has gone to the forsterite stage, using naturally-occurring raw materials, such as olivine, and in these cases, failure by shear has occurred at temperatures below 1550° C.

In summary, two serious short-comings in magnesia refractories provided by the prior art have been excessive softening at high temperatures and excessive loss from spalling, both faults being at least in part traceable to the glassy matrix which bonds the MgO crystals together to form the grain.

This invention is predicated upon the discovery that magnesia refractories of increased hot-load strength and of excellent refractoriness are obtained when magnesia is present in the grain material in amounts of from about 63% to about 93%, and silica in amounts of from about 6.5% to about 37%, provided other impurities present do not exceed about 3.5%, and preferably do not exceed about 2.5%. These percentages are on the ignited basis, that is, are based on the total weight of the fired refractory grain material. With regard to individual impurities, CaO should preferably not exceed about 1.5%; $Fe_2O_3$ should not exceed 1.0%; $Al_2O_3$ should not exceed about 0.5%; and $B_2O_3$ should not exceed about 0.3%. The latter three compounds are generally designated $R_2O_3$, or sequioxides. In other words, small amounts of the impurities, as indicated, may be dispersed through the crystalline matrix of these compositions and do not seriously impair the performance of the refractories, but larger amounts lead to premature failure and preclude the formation of the desired structure. Greater purities than those indicated by these tolerances give correspondingly better results. By employing magnesia grain material containing not over 2.23% of impurities, based on the weight of the total refractory composition, magnesia refractory brick have been obtained, according to this invention, which withstand a load of 25 pounds per square inch to 1790° C. without failure. After cooling, these bricks showed only 3.5% linear deformation. In contrast to this, tests on samples of nine different commercial magnesia refractory bricks showed average failure by shear at 25 pounds per square inch loading at 1477° C., the highest temperature reached being 1530° C. and the lowest, 1435° C.

Microscopic study of thin sections of refractories made according to this invention has led to the belief that the unexpected improvement in the properties and behavior of these refractories is due to the formation of a characteristic crystalline matrix structure containing embedded magnesia crystals. The matrix of crystalline material essentially comprises, within the ranges given, uniform admixtures of magnesium oxide and magnesium orthosilicate, or solutions of one in the other. In this crystalline matrix, the magnesia crystals are imbedded and are held apart thereby, in contrast to the former art in which the magnesia crystals touch one another or have only thin films of glassy material between them. The crystalline matrix of the compositions of this invention appears to take the form of well-defined "host" crystals, in which the magnesia crystals are contained.

Study of thin sections of the refractory material of this invention by the petrographic microscope under crossed nicols reveals structures which are reproduced in Figures 1 to 5 of the drawing, which will be described in greater detail below. Since the forsteritic host crystals are birefringent, it is possible to see by rotation of the microscope stage that areas of the field which are many times larger than the periclase crystals are controlled by or contained in the host crystals. The periclase crystals are revealed as being dispersed in the host crystals, and the host crystals provide an interlocking network of elongated angular elements. It is thought that the improvement obtained is at least in part due to this interlocking network of host crystals which do not readily slip past each other under load at high temperatures as do the rounded magnesia crystals.

The product of this invention and the structure and chemical composition of the refractory material are more clearly illustrated by the drawings in which Figure No. 1 represents a thin-section of the magnesia material of the prior art which has a lower silica content, that is, of rounded magnesia crystals containing from about 2.5% to about 5% by weight of silica; Figure No. 2 represents a thin-section of a magnesia refractory grain made according to this invention and containing about 10% of silica and about 86% of magnesium oxide, as seen by means of the petrographic microscope as described above, Fig. No. 3 is similarly a thin-section of a magnesia refractory grain according to this invention and containing about 30% of silica and about 67% of magnesia: Fig. No. 4 represents a thin-section of a magnesia refractory grain according to this invention and containing about 36% of silica and about 61% of magnesia: Fig. No. 5 represents a thin-section of forsterite refractory containing about 42.2% silica and about 57.8% magnesia. Table II below shows the chemical analyses and the results of hot-load testing of materials made according to the invention and corresponding to some of the figures of the drawing, and also of materials (Tests 1 and 7) of compositions not exhibiting the host-crystal structure.

As shown by the drawings, the structures of compositions ranging up to about 6% of silica are dominated by crystalline magnesia, the crystals being rounded and lying closely adjacent each other. Here the forsteritic host crystal is absent, or may be very poorly developed, but in any case, is subordinate to the periclase crystals. The host crystal evidently begins to develop at between 6% and 7% $SiO_2$.

The compositions, according to this invention, in which the host crystal structure predominates, contain from about 6.5% silica and 93% magnesium oxide to about 37% silica and 63% magnesia. As shown in the drawings, relatively large host crystals of elongated, irregular shapes are visible when thin sections are examined microscopically under crossed nicols. The smaller magnesia crystals are dispersed therethrough, but the fields are dominated by the host crystals as described more fully above.

The MgO-forsterite eutectic forms at about 37% $SiO_2$–63% BgO and the characteristic structure of the present invention is lost at this stage.

The range of composition in which the benefits of the desired refractory structure are secured lies between about 6.5% and 37.0% by weight of $SiO_2$, the balance of the composition being essentially MgO. Good results are obtained from refractories throughout this range, provided the content of compounds other than MgO and $SiO_2$ is limited as set forth herein. For various applications compositions may be selected from one or the other part of the range. When a more basic refractory is desired the composition can be higher in MgO, or when a lighter or less basic refractory or a refractory showing less thermal expansion is indicated, the composition can be nearer to that of the eutectic between forsterite and MgO (37% $SiO_2$; 63% MgO).

Besides limiting the content of impurities in the starting materials, it has also been found that the silica and the magnesia-containing material should be thoroughly interdispersed in order to obtain a homogeneous product, proper development of the desired structure, and best resistance to thermal spalling. To achieve these ends it is desirable to use silica and magnesia in as fine a state of subdivision as possible, for example, substantially all finer than 44 microns. It is preferred to use silica containing a major proportion of particles finer than 10 microns in diameter. Similarly, it is preferred that a substantial proportion of the magnesia be finer than 10 microns in particle size. When using starting materials of these sizes, it is possible to produce refractories of the desired characteristics, and exhibiting the host-crystal structure, without melting. Such production can be carried out in a rotary kiln. This feature of the invention permits rapid, large-quantity and economical production of the high-purity magnesia refractory material.

The preferred source of magnesia is magnesium hydroxide precipitated from seawater, or other magnesium salt solutions, by lime, calcined dolomite, calcium hydroxide, or the like; or magnesium carbonate precipitated from such solutions. The precipitated material is washed, and recovered by filtration, and, if desired, is calcined. This source is preferred because of its fine particle size and because it can be obtained in a high state of purity. Other sources of magnesia of comparable purity can be used provided the material is first pulverized, ground or otherwise reduced to extremely fine subdivision. This comminution and also the mixing with the silica can be carried out in either a wet or a dry method. When magnesite, brucite or another ore is used as the source of magnesia it is preferable in some cases to grind the ore or calcined ore and the silica together in order to provide the desired intimate inter-dispersion. When precalcined magnesia is used as the source of magnesium oxide it has been noted that a tougher product is obtained, which, however, may have slightly higher porosity; and when magnesium hydroxide is the source of the MgO, the product is denser but tends to be more brittle.

The preferred silica is that obtained by precipitation from a vapor. The silica obtained, for example, by the oxidation and cooling of vapors issuing from a reduction zone wherein silica is being reacted with a reducing agent, is amorphous, and consists essentially of spherical particles smaller than 44 microns diameter, and contains a major proportion of such particles smaller than 10 microns and a substantial proportion smaller than 1 micron. Such a silica can be recovered, for example, from the fume arising from the electro-thermal reduction of silica or siliceous ores as in the production of ferrosilicon or ferrochromium. The silica recovered from this fume contains substantially 67.1% of amorphous, spherical particles finer than 1 micron diameter. In addition to these silicas, rice hull ash, diatomaceous earth, etc. are also useful in this invention.

The admixture of the silica and magnesia-containing material is made prior to firing, and under conditions such as to insure the best possible interdispersion of the two materials. When precipitated magnesium hydroxide is used as the source of magnesia the silica can be added to the brine prior to precipitation, or it can be added to the slurry of precipitated hydroxide. Very good dispersal can be achieved by suitable mixing devices, such as turbine mixers, homogenizers, high-speed pumps or propellers, or the like, when the materials are thus mixed in a liquid medium.

Alternatively, silica can be blended with calcined magnesia, advantageously in a ball mill which also serves to reduce the materials to the required state of subdivision. Such grinding can be done dry, but it may be preferable to grind by the wet method. When a mined ore is used as the source of magnesia the silica can be added either before or after calcining, but in either case the magnesia should be finely subdivided and thoroughly blended with the silica before the final calcination step.

The mixture is fired to equilibrium without substantial fusion. The preferred firing method is the firing of a slurry of the desired composition in a rotary kiln. This method is desirable from the standpoint of efficiency and relative ease of production in large volumes. Rotary kilns may also be employed on dry powdered feed, nodulized feed, agglomerated feed or on pelleted feed. Each of these methods may have advantages sufficient to recommend them in particular instances. Other than rotary kilns, stack kilns may be employed, or tunnel or periodic kilns may be used on dry feed which has been pressed into agglomerates.

The burning is carried out at a temperature and for a time which will result in a well-crystallized, well-shrunk refractory material. When employing starting materials of the particle size and of the purity set forth above, the burning can be effected by heating at 1650°–1750° C. for one-half to three-quarters of an hour, for example. The resulting product has an apparent porosity of less than about 15%, and usually of 10% to 14%.

As a specific example, the preparation of a high-magnesia refractory material is described below. Magnesium hydroxide is precipitated from sea-water by high purity calcined dolomite and the resulting slurry is washed in countercurrent washing thickness to remove calcium chloride, sodium chloride, and other soluble salts.

After washing and thickening the slurry has the following typical analysis:

Solids (Mg(OH)$_2$) in slurry, 19.0% (by weight)

*Analysis of solids in percent by weight*

|  | As Mg(OH)$_2$ | As MgO (ignited Basis) |
|---|---|---|
| SiO$_2$ | 1.00 | 1.49 |
| Fe$_2$O$_3$ | 0.18 | 0.27 |
| Al$_2$O$_3$ | 0.06 | 0.09 |
| CaO | 0.85 | 1.27 |
| MgO | 67.36 | 96.9 |
| Ignition Loss | 30.55 | |

With this slurry is blended sufficient volatilized silica to result in a silica content of approximately 8% in the finished product. The volatilized silica used is the by-product recovered from the fume given off in ferrosilicon production, and it contains approximately 97.5% SiO$_2$ and consists substantially of particles smaller than 10 microns in size. The mixing is carried out in a suitable device such as a turbine mixer so as to get the best possible dispersal of the silica in the slurry and arrive at a homogeneous product. The mixture is then filtered, for example on drum type vacuum filters, and is subsequently fed to a rotary kiln. Burning is carried out to a top temperature of between 1700° C. and 1750° C. and the material remains in the hot zone for approximately 30 minutes. Upon cooling, the material is crushed to suitable sizes for refractory manufacture. At this time the material has an apparent porosity of 12.8%, and thin-section microscopic study shows a forsteritic host crystal structure as described above. A typical chemical analysis is as follows:

| | |
|---|---|
| MgO (by difference) | 89.61 |
| SiO$_2$ | 8.11 |
| Fe$_2$O$_3$ | 0.83 |
| Al$_2$O$_3$ | 0.17 |
| CaO | 1.28 |

This refractory material may be employed in refractory compositions in which conventional periclase material would be suitable, such as bricks, ramming mixes and other compositions, and greatly improved results are to be expected from its use provided that the above defined limits on impurities and fluxing materials are carefully observed throughout the refractory manufacture. Except for this precaution the material is employed in the same manner as other magnesia refractory materials in any process known to the art to yield improved results.

For example, to prepare a magnesia refractory brick having unusual resistance to load at high temperatures, the following procedure may be followed. The above refractory material is crushed, ground, and sized to yield approximately the following proportions:

| | Per cent |
|---|---|
| Minus 6+20 mesh | 50 |
| Minus 20+100 mesh | 20 |
| Minus 100 mesh | 30 |

A batch of this composition is blended in a wet-pan mixer and wet with approximately 3% of water containing 1% of magnesium chloride in solution, and after the grains are uniformly blended and wet, 10% of minus 325 mesh slow-setting magnesia analysing 97% MgO is blended in to form the bond. The mass is then formed into shapes at high pressures, and the shapes are allowed to cure and are dried before use. They may be fired in use. However, the best results as regards strength at high temperatures are secured when the bricks are fired before use. The firing may be carried out at 1200° C. or higher to produce a fired refractory having satisfactory strength when cold and which is capable of withstanding a load of 25 lbs. per sq. inch to temperatures in excess of 1800° C.

In another example, magnesium hydroxide slurry and volatilized silica, having the properties described in the previous example, are blended together in proportions to yield, upon ignition, a calcine having the following composition:

| | Per cent |
|---|---|
| MgO | 77.6 |
| SiO$_2$ | 18.8 |
| Fe$_2$O$_3$ | 1.33 |
| Al$_2$O$_3$ | .83 |
| CaO | 1.04 |

The resulting slurry is dried in a rotary kiln, and the calcine is pelleted or nodulized and fed to a stack kiln in which it is fired to approximately 1750° C. The resulting clinker may be used in a manner similar to the product of Example 1. A brick prepared from this product withstood load of 25# per square inch to 1715° C. before failure. It is to be noted that the sum of lime, iron oxide, and alumina is 3.2%. Reduction in the amounts of these impurities would result in improved performance.

In still another example, a high-purity magnesite is employed as the magnesia source. A representative analysis of this material is as follows:

| | As MgCO$_3$, Per Cent by weight | On the Ignited Basis, Per Cent by weight |
|---|---|---|
| Ignition Loss | 51.69 | |
| SiO$_2$ | 0.12 | 0.25 |
| Fe$_2$O$_3$ | 0.57 | 1.18 |
| Al$_2$O$_3$ | 0.11 | 0.23 |
| CaO | 0.04 | 0.08 |
| MgO (by difference) | 47.47 | 98.26 |

This material is blended with sufficient high-purity silica to give the desired composition. In this example, the silica contains 98.5% of particles finer than 44 microns diameter, 62.8% finer than 10 microns, and 15.7% finer than 1 micron. This material analyzes, typically, 98.20% SiO$_2$, 0.34% Fe$_2$O$_3$, 1.16% Al$_2$O$_3$ and a trace of CaO. 70 parts by weight of magnesite as magnesia are admixed with 30 parts by weight of the silica.

The magnesite and silica are ground together in a ball mill, suitably as a slurry with water, until substantially all the mixture is finer than 44 microns. The slurry is filtered, if desired, and is fired. The resulting grain material is useful for making into brick, ramming mixes or other refractory use. Alternatively, the magnesite can be fired to magnesia before mixing.

The composition and properties of refractory materials made according to this invention are set forth in Table II, and therein are shown some test results obtained when the materials exhibit structures illustrated by the drawings, and also results obtained with materials of the prior art.

TABLE II

| Test No. | Refractory Material, Per cent by weight | | | Zone of— | Result: Shear, or Per cent Deformation | At °C. |
|---|---|---|---|---|---|---|
| | MgO | SiO₂ | Impurities | | | |
| 1 | 93.0 | 3.6 | 3.4 | Fig. 1 | Shear | 1,440 |
| 2 | 90.6 | 7.1 | 2.3 | ---do--- | -----do----- | 1,795 |
| 3 | 90.7 | 7.6 | 1.7 | ---do--- | 3.5% | 1,790 |
| 4 | 88.8 | 8.0 | 3.2 | ---do--- | Shear | 1,810 |
| 5 | 78.0 | 18.8 | 3.2 | ---do--- | -----do----- | 1,715 |
| 6 | 68.9 | 28.0 | 3.1 | Fig. 3 | -----do----- | 1,710 |
| 7 | 56.9 | 42.1 | 1.0 | Fig. 5 | -----do----- | 1,600 |

Grain material of the composition shown was sized, graded, mixed with high-purity, finely divided magnesia and magnesium chloride solution to effect bonding and shaped into bricks. The bricks were tested by firing under 25 lbs. per square inch loading, some pre-fired and some green, to obtain the results shown above.

In the specification and claims analyses are shown in percent by weight on the ignited basis, unless otherwise indicated. The term "magnesia-containing, magnesia-yielding, magnesium oxide-containing and magnesium oxide-yielding" and "magnesium compound which yields magnesia upon firing" are intended to include magnesia or magnesium oxide, as well as substances, such as magnesium hydroxide or magnesium carbonate for instance, which provide magnesia or magnesium oxide in the refractory composition. In conformity with common practice in reporting chemical analyses of refractory materials, the proportions of the various chemical constituents present in a material are given as though these constituents were present as the simple oxides. Thus, the magnesium constituent is reported, for example, as magnesium oxide or MgO, the silicon constituent as silicon dioxide or silica, and so on, although in the fired product the silica and part of the magnesia are combined as forsterite, and the other minor constituents, such as iron oxide, lime, etc. may also be present in various chemical combinations.

What is claimed is:

1. A fired forsteritic refractory material consisting of agglomerates which exhibit upon petrographic microscopic examination elongated angular forsterite host crystals, said crystals each having dispersed therein periclase crystals.

2. A fired forsteritic refractory material exhibiting under petrographic microscopic examination dense non-porous aggomerates of elongated angular forsterite host crystals, and periclase crystals dispersed within said host crystals, said refractory material containing from 6.5% to 37% silica and not over 3.5% ingredients other than silica and magnesia, the remainder being magnesia, said silica being present in combination with part of said magnesia as forsterite.

LESLIE W. AUSTIN.

REFERENCES CITED

The following references are of record in the file of this patent:

UNITED STATES PATENTS

| Number | Name | Date |
|---|---|---|
| 1,758,518 | Jakob | May 13, 1930 |
| 2,095,982 | Heany | Oct. 19, 1937 |
| 2,313,746 | Heany | Mar. 16, 1943 |

FOREIGN PATENTS

| Number | Country | Date |
|---|---|---|
| 189,320 | Germany | 1907 |